United States Patent
Holzer et al.

(10) Patent No.: US 8,702,557 B2
(45) Date of Patent: Apr. 22, 2014

(54) METHOD FOR CONTROLLING A PLANETARY GEAR SET IN A BELT DRIVE AND BELT DRIVE

(71) Applicant: Schaeffler Technologies AG & Co. KG, Herzogenaurach (DE)

(72) Inventors: Lukas Holzer, Sasbach (DE); Martin Dilzer, Buehl (DE); Mathias Goeckler, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/946,480

(22) Filed: Jul. 19, 2013

(65) Prior Publication Data
US 2013/0303329 A1    Nov. 14, 2013

Related U.S. Application Data

(63) Continuation of application No. PCT/DE2011/002136, filed on Dec. 19, 2011.

(30) Foreign Application Priority Data

Jan. 20, 2011   (DE) .......................... 10 2011 009 046

(51) Int. Cl.
*F16H 57/08*    (2006.01)
(52) U.S. Cl.
USPC ......................................................... 475/318

(58) Field of Classification Search
CPC ......... F16H 3/72; F16H 57/08; F16H 37/022; F16H 9/26; F16H 2200/2005; F16H 2200/2066; F16H 2200/2082
USPC .................................................. 475/317, 318
See application file for complete search history.

(56) References Cited

U.S. PATENT DOCUMENTS

| 6,668,953 | B1 * | 12/2003 | Reik et al. ..................... 180/53.8 |
| 8,029,403 | B2 * | 10/2011 | Lee et al. ........................ 475/276 |
| 8,152,669 | B2 * | 4/2012 | Maguire et al. .................... 475/5 |
| 2004/0043859 | A1 * | 3/2004 | Yurgil et al. ................... 475/318 |

FOREIGN PATENT DOCUMENTS

DE       102011087524 A1    6/2012

* cited by examiner

*Primary Examiner* — Edwin A Young
(74) *Attorney, Agent, or Firm* — Simpson & Simpson, PLLC

(57) ABSTRACT

A method and device for controlling a shiftable planetary gear set in a belt drive of an internal combustion engine in a motor vehicle having a sun gear which is fixedly connected to a belt pulley, a ring gear which can be connected fixedly with respect to the housing by means of a brake which is activated by an electrically operated actuator which is effective along a distance which is monitored by a relative distance sensor, as well as a web which is connected to a crankshaft of the internal combustion engine and rotatably accommodates planetary gears, wherein situated between the sun gear and the web is a free wheeling mechanism which can be switched and rolled over in both directions and is switched by the same actuator along the travel distance.

12 Claims, 2 Drawing Sheets

METHOD FOR CONTROLLING A PLANETARY GEAR SET IN A BELT DRIVE AND BELT DRIVE

CROSS-REFERENCE TO RELATED APPLICATIONS

This application claims priority from International Patent Application PCT/DE2011/002136, filed Dec. 19, 2011, which, in turn, claims priority from German Patent Application No. DE 10 2011 009 046.0, filed Jan. 20, 2011, which applications are incorporated herein by reference in their entirety.

FIELD OF THE INVENTION

The invention relates to a device and a method for controlling a shiftable planetary gear set in a belt drive of an internal combustion engine in a motor vehicle having a sun gear which is fixedly connected to a belt pulley, a ring gear which can be connected fixedly with respect to the housing by means of a brake which is activated by an electrically operated actuator which is effective along a travel distance which is monitored by a relative distance sensor, as well as a web which is connected to a crankshaft of the internal combustion engine and rotatably accommodates planetary gears, wherein situated between the sun gear and the web is a freewheeling mechanism which can be switched and rolled over in both directions and is switched by the same actuator along the travel distance.

BACKGROUND OF THE INVENTION

In the unpublished German patent application No. 10 2010 056 167.3 a belt drive of this species is disclosed, wherein in a pulley plane a plurality of units, but at least one belt starter-generator and possibly an air conditioner compressor and others, are operatively connected by means of a belt to the crankshaft of an internal combustion engine of a motor vehicle. To adjust the torques transmissible from and to the latter, and the speeds of rotation which occur thereby, a shiftable planetary gear unit is integrated into the belt drive, whose sun wheel is connected to the belt and therefore ultimately to the belt starter-generator, while the ring gear can be connected fixedly with respect to the housing by means of a brake, and the web which accommodates the planet carrier is operatively connected to the crankshaft in a rotationally fixed connection. Situated in the power path between sun wheel and web is a switchable freewheeling mechanism, which is switchable to blocking and over-rolling in both directions of transmission, depending on the switched state. Depending on the switched state of the brake and of the freewheeling mechanism, the switched states of the planetary gear set result, in order to activate corresponding transmission ratios and flows of torque for example in generator mode, in which the belt starter-generator is driven by the crankshaft, in starting operation of the internal combustion engine, in which the crankshaft is driven by the belt starter-generator, or in stationary air conditioning operation, in which the air conditioner compressor is driven by the belt starter-generator while the crankshaft is standing still.

In this case, the brake and the freewheeling mechanism are actuated by a single actuator, which is, for example, an electric motor with a spindle gear unit. The actuator moves the actuating devices of the brake and of the freewheeling mechanism jointly along a travel distance. In particular for reasons of cost, the travel distance is monitored by a relative distance sensor, which must be calibrated and referenced regularly.

BRIEF SUMMARY OF THE INVENTION

The invention relates to a device and a method for controlling a shiftable planetary gear set in a belt drive of an internal combustion engine in a motor vehicle having a sun gear which is fixedly connected to a belt pulley, a ring gear which can be connected fixedly with respect to the housing by means of a brake which is activated by an electrically operated actuator which is effective along a distance which is monitored by a relative distance sensor, as well as a web which is connected to a crankshaft of the internal combustion engine and rotatably accommodates planetary gears, wherein situated between the sun gear and the web is a free wheeling mechanism which can be switched and rolled over in both directions and is switched by the same actuator along the travel distance. In order to be able to assign the relative sensor signals of the distance sensor to an unambiguous travel position of the actuator, the travel distance of the actuator is ascertained by means of relative travel distance signals of the distance sensor, and the relative distance sensor is referenced to an absolute value by means of at least one reference pass of the actuator, wherein electrical behavior of the actuator is analyzed at at least one predefined travel point of the travel distance, and the at least one predefined travel point is defined as an absolute value depending on the electrical behavior of the actuator.

The object of the invention is to propose a method for controlling the switchable planetary gear set and a belt drive for carrying out the method, wherein the relative distance sensor may be employed to measure the absolute travel distance.

The object is fulfilled by a method for controlling a switchable planetary gear set in a belt drive of an internal combustion engine in a motor vehicle, having a sun gear which is fixedly connected to a belt pulley, a ring gear which can be connected fixedly with respect to the housing by means of a brake which is activated by an electrically operated actuator which is effective along a travel distance which is monitored by a relative distance sensor, as well as a web which is connected to a crankshaft of the internal combustion engine and rotatably accommodates planetary gears, wherein situated between the sun gear and the web is a freewheeling mechanism which can be switched and rolled over in both directions and is switched by the same actuator along the travel distance, the travel distance of the actuator is ascertained by means of travel distance signals of the relative distance sensor, a referencing of the relative distance sensor to an absolute value occurs by means of at least one reference pass of the actuator, an electrical behavior of the actuator is analyzed at least one specified travel point of the travel distance, and the at least one specified travel point is established as an absolute value depending on the electrical behavior of the actuator.

A routine for referencing is advantageously carried out at least prior to a starting of the internal combustion engine. In general, travel information of the relative distance sensor is lost after a shutdown of the control device, or is inexact as a result of changing physical parameters of the motor vehicle between shutdown and restarting of the control device due, for example, to the cooling down of the internal combustion engine and the like or due to maintenance work, so that an obtained absolute value of the travel position of the actuator can no longer be clearly assigned.

The actuator preferably consists of an electric motor having a spindle drive and a spindle nut. The spindle nut enables the actuating devices of the brake and of the freewheeling mechanism to be switched along the travel distance of the nut. It has proven advantageous in this case, starting from a zero position, to actuate the brake along one segment of the travel distance and to actuate the freewheeling mechanism along another segment, so as to be able to actuate the brake and the freewheeling mechanism independently of each other. In this case, the actuating devices of the brake and of the freewheeling mechanism are each independent of the other, which means that the brake is switched from a preferred position into one direction along the travel distance and the freewheeling mechanism is switched into the other direction, for example by a lever mechanism, without the brake being actuated when the freewheeling mechanism is switched over or the freewheeling mechanism being switched over when the brake is actuated on the same segment, thus preventing damage to the planetary gear set and to the freewheeling mechanism.

At the same time, the vectorial travel distance of the actuator, for example of its spindle nut, can deviate from the vectorial actuation direction of the brake and/or of the free heeling mechanism, and brake and freewheeling mechanism can be spatially separated from each other. To this end, the actuating devices are designed accordingly. For example, by means of the applicable brake the brake can be actuated in the (pressed-open or pulled-open state or in the pressed-closed or pulled-closed state. The freewheeling mechanism can be switched in a preferred position, for example by spring loading, and can be moved to a second position with a cable control by means of the applicable actuating device.

The electric motor is controlled by a control device by means of software which determines the switched state of the freewheeling mechanism through the position of the spindle nut, and determines the torque transmitted through the brake with the aid of a characteristic curve of the torque transmitted through the brake over the travel distance. An appropriate adjustment of the characteristic curve to the travel distance can be achieved by means of a determination of the contact point of the brake, and/or can occur through referencing the relative distance sensor which uses the ascertained absolute value to calculate the contact point.

Because of the proposed referencing of the relative distance sensor, a costly and space-demanding absolute distance sensor can be dispensed with. The element used as a relative distance sensor can be advantageously a rotational angle sensor with incremental distance measurement provided on the electric motor, for example for commutation, using which changes in the rotational angle of the electric motor are measured, and an increment of distance on the spindle can be assigned to each increment of rotation via the spindle. The present travel point of the spindle nut is calculated by adding up these increments of distance. The physical starting position of the spindle nut, i.e., the absolute value of the actuator at a specified travel point, is needed to determine the absolute travel point.

According to the inventive idea, at least one exposed travel point is provided along the travel distance, at which the absolute value is assigned to the distance signals of the relative distance sensor. This at least one exposed travel point can be formed on one or both segments as a stop, cam, switch or the like, where the information of the switch can be obtained to determine the absolute value, or on the other hand the electrical behavior is a change of current, voltage and/or power at the stop or cam with no change in the travel distance signal of the distance sensor. For example, at a stop an unchanging distance signal is observed while at the same time the current and/or power increases, and is established as arrival at the stop. When passing the cam, while the distance signal changes an increase of current and/or power is detected, and the absolute value is assigned to the present distance signal. From the known physical position of the stop, cam or switch, the absolute travel distance of the spindle nut is ascertained in the control device by means of the absolute value and the relative distance signals such as increments of a rotational angle sensor and the pitch of the spindle.

The exposed travel point can be provided physically on the actuator itself, for example on its spindle or on one or both actuating devices of the brake or the freewheeling mechanism. According to an advantageous exemplary embodiment, an exposed travel point is situated along the segment to actuate the freewheeling mechanism in its actuating device. In this case, the spindle nut is connected to a freewheeling cage by a control cable. The freewheeling cage itself is held in a preferred position of the freewheeling mechanism by a return spring; the freewheeling cage assuming this preferred position when there is no tension on the control cable.

The freewheeling mechanism is moved along the crankshaft axis by the actuator by means of the control cable, until it reaches a hard stop. A rigid connection exists between the freewheeling cage and the spindle nut, by means of the control cable. If the freewheeling mechanism is at the stop, the actuator cannot be moved further along the segment after reaching this exposed travel point. This travel point is then defined as the absolute value, if the actuator no longer moves for a specified time interval although a constant actuator force is applied to the control cable in the direction of the segment. In this case, the amount of actuator force against the stop in the direction of the segment is designed so that the freewheeling cage is reliably moved to this hard stop under the existing forces. Alternatively or in addition, electrical or mechanical values present at the electric motor or generated by it, for example the voltage or actuator force, can be integrated over time, and after a threshold is reached the absolute value can be determined, in order to possibly avoid an overloading of the electric motor and/or of the actuating device and to determine the absolute value as rapidly as possible.

To compensate, for example, for the elasticity of the control cable and thus for absolute travel points which change in this exemplary embodiment, for example depending on the temperature, allowance can be made for temperature dependency of the elasticity. Furthermore, allowance can be made for stretching of the cable control over its life. Furthermore, the stretching of the cable control can be adapted. For example, a contact point adaptation of the brake, which may occur on the basis of measured variables such as current, voltage, power or the like of the belt starter-generator as the brake is engaged or disengaged and which are used to adapt the characteristic curve of the brake, or the shift of the contact point, may be drawn upon to adapt the stretching of the cable. The stretching of the control cable causes a shift of the exposed travel point to smaller travel distances of the actuator, so that as the stretching of the cable control increases in any case a switching of the freewheeling mechanism continues to be assured.

The referencing is preferably carried out by means of a routine in the control device, wherein this preferably occurs depending on detecting the presence of a driver in the motor vehicle. In the simplest case, the routine is started when the ignition in the motor vehicle is switched on. But in order, if necessary, to not prolong the starting times of the motor vehicle due to the running routine, the start of the routine is advantageously moved up. To this end, signals from sensors or switches can be analyzed, for example if the driver door is opened, the key or a comparable device is inserted into the ignition lock, or the driver actuates a seat sensor in the driver's seat, actuates a buckling sensor when buckling the seat belt, and/or the wireless remote control of a central locking system.

In addition, the object is fulfilled by a belt drive on an internal combustion engine of a motor vehicle for carrying out the proposed method, having a plurality of units which enter into operative connection with a belt, among them a belt starter-generator, a switchable planetary gear set having a sun gear which is fixedly connected to a belt pulley, a ring gear which can be connected fixedly with respect to the housing by means of a brake which is activated by an electrically operated actuator which is effective along a travel distance which is monitored by a relative distance sensor, as well as a web which is connected to a crankshaft of the internal combustion engine and rotatably accommodates planetary gears, wherein situated between the sun gear and the web is a freewheeling mechanism which can be switched and rolled over in both directions and is switched by the same actuator along the travel distance.

BRIEF DESCRIPTION OF THE DRAWINGS

The invention will be explained in further detail on the basis of the exemplary embodiments depicted in FIGS. 1 through 4, wherein the figures show the following.

DETAILED DESCRIPTION OF THE INVENTION

Figure 1:
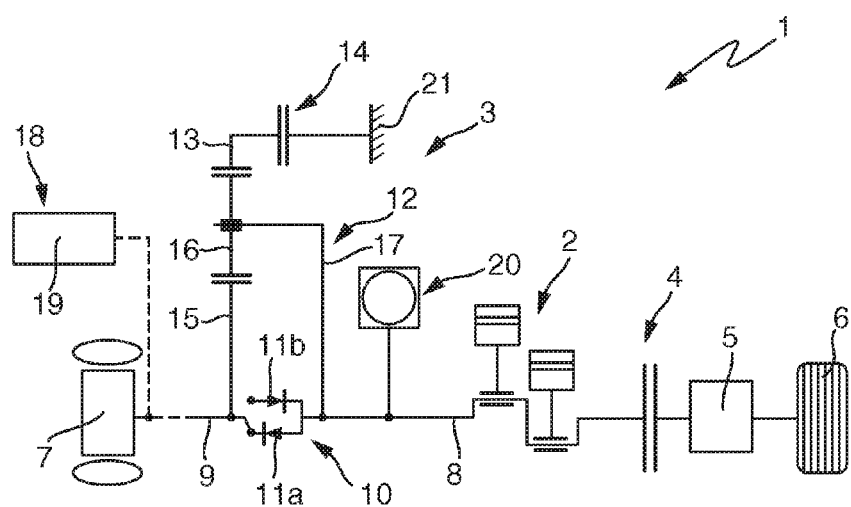
FIG. 1 is a basic layout sketch of a drivetrain of a motor vehicle having a belt drive.

FIG. 1 shows a schematic depiction of the drivetrain 1 of a motor vehicle with the internal combustion engine 2, the belt drive 3, the friction clutch 4, the gear unit 5 and the driving wheel 6.

The internal combustion engine 2 drives with its crankshaft 8 both the gear unit 5, which may be designed as a shift transmission, automated shift transmission, dual-clutch transmission and the like, and the belt drive 3. The belt drive 3 contains the belt starter-generator 7, whose rotor 9 is connectible in a rotationally fixed connection, for example coaxially or by means of pulleys and belts—not shown—to the crankshaft 8 of the internal combustion engine, by means of the counter-operative switching device in the form of the freewheeling mechanism 10 having the switched states 11a, 11b, which is switched by means of the actuator according to the invention, which is not shown. Here the first switched state 11a activates the flow of torque from the crankshaft 8 to the rotor 9 and blocks it in the opposite direction, while the second switched state 11b enables the flow of torque from the rotor 9 to the crankshaft 8 and blocks it in the opposite direction. The switched states 11a, 11b of the freewheeling mechanism 10 are activated alternatively. Furthermore, connected between the rotor 9 and the crankshaft 8 is the planetary gear set 12, whose ring gear 13 can be connected fixedly with respect to a housing, for example the engine housing 21 of the internal combustion engine 2, by means of the brake 14 in the form of a disk brake. The sun gear 15 is connected to the rotor 9 in a rotationally fixed connection. The planet gears 16 which mesh between the ring gear 13 and the sun gear 15 are accommodated on the web 17. The web 17 is connected to the crankshaft 8 in a rotationally fixed connection.

Furthermore, at least one ancillary unit 18 is connected to the rotor 9 in a rotationally fixed connection, for example linked into the belt of the belt drive 3 by means of a pulley. In the exemplary embodiment shown, the ancillary unit 18 is formed by the air conditioner compressor 19, which is connected to the rotor 9 in a rotationally fixed connection with a fixed transmission ratio change or no change.

Assigned to the crankshaft 8 in a rotationally fixed connection is the pulley damper 20, which can be designed as an absorber and/or damper.

By actuating the freewheeling mechanism 10 and the brake 14 appropriately by means of the actuator—not shown—which controls all actuating functions, in the form of actuating mechanisms, corresponding operating states of the drivetrain 1 are controlled. In this case, the brake 14 controls the transmission ratio of the planetary gear set 12, and the freewheeling mechanism 10 controls the flows of torque between rotor 9 and crankshaft 8. Depending on the operating condition of the internal combustion engine 2 and of the belt starter-generator 7, a plurality of advantageous operating conditions of the drivetrain 1 result, which will be considered in detail in the following FIGS. 2 through 4.

In reference to an exemplary embodiment of the design of belt drive 3, please see German application No. 10 2010 056 167.3, which is hereby incorporated in its entirety into the disclosure of the present application.

Figure 2:
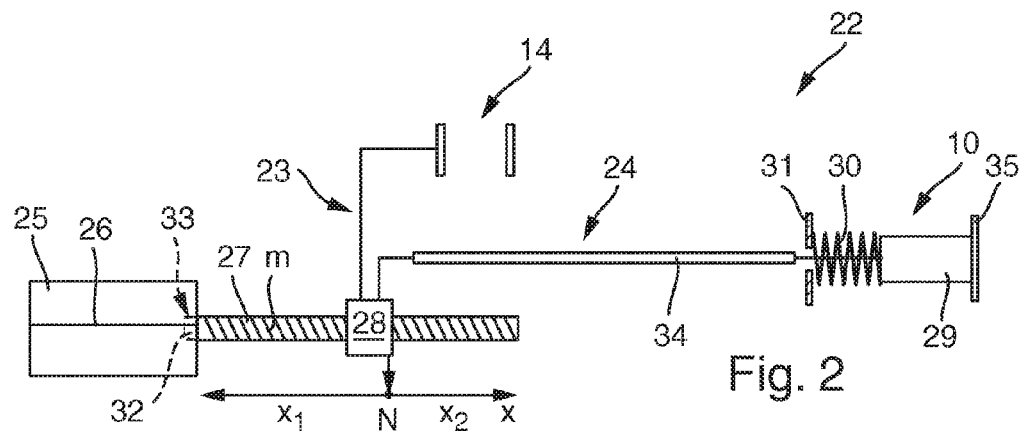
FIG. 2 illustrates an actuator for actuating the switchable planetary gear set of the belt drive of FIG. 1 in a zero position.

FIG. 2 shows schematically the actuator 22 with the actuating mechanisms 23, 24 for the brake 14 and the freewheeling mechanism 10. To drive the actuating mechanisms 23, 24 linearly, the actuator 22 contains the electric motor 25, whose rotor 26 drives the spindle 27, on which the spindle nut 28 is accommodated in a rotationally fixed and axially movable manner. The spindle nut 28 is movable along the travel distance x as the spindle 27 is driven rotationally, and moves the actuating mechanisms 23, 24 accordingly. The actuator 22 is depicted in FIG. 2 in the zero position N, which divides the travel distance x into the segments $x_1$, $x_2$. If the spindle nut 28 is moved from the zero position N in the direction of the segment $x_1$, the cable control 34 of the actuating mechanism 24 is actuated, and the freewheeling cage 29 is moved contrary to the effect of the spring device 30 in the direction of the stop 31. The freewheeling mechanism is thereby switched from a first, preferred switched state at the stop 35 into a second switched state. If the spindle nut 28 is moved from the zero position N in the direction of segment $x_2$, the brake 14 is engaged.

The rotary motion of the rotor 26 is registered by means of the rotational angle sensor 32, which registers rotational angle increments and thereby serves, for example, to commutate the electric motor 25. Furthermore, the rotational angle sensor 32 is used as a relative distance sensor 33 to ascertain the relative movement of the spindle nut 28 along the spindle 27, while the relative movement is ascertained from the pitch in of the spindle 27 and the angle of rotation or the number of increments of angle of rotation. At the same time, the absolute distance traveled is determined from the relative distance traveled compared to a travel point stored in the control device to control the electric motor 25.

Figure 3:
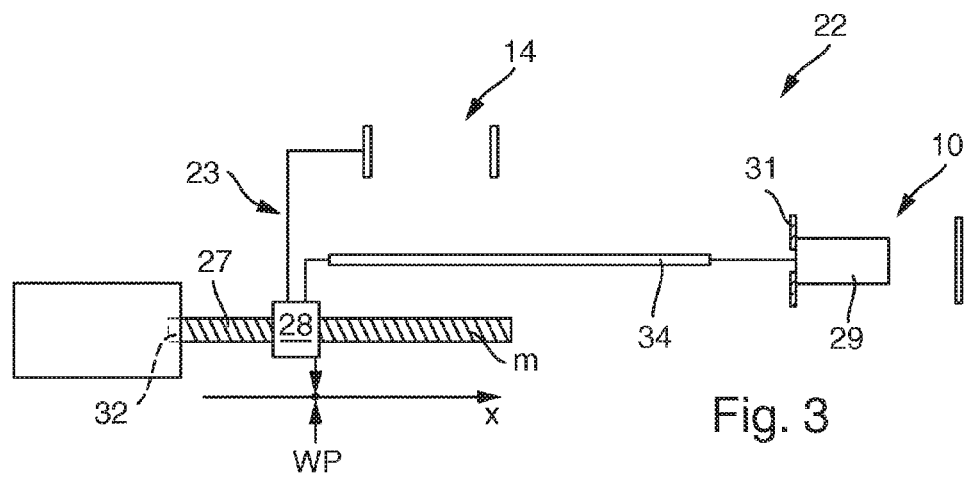
FIG. 3 illustrates the actuator of FIG. 2 during referencing.

If the information about the absolute travel point gets lost, or if it can be assumed to be inexact, a routine is started which makes it possible to reference the absolute travel point. To this end, the stop 31 is provided in the actuating mechanism 24. If the spindle nut 28 is moved by rotating the spindle 27—as shown in FIG. 3—, and in addition to moving the freewheeling cage 29 into the second switched state the stop 31 is also traveled, so that with a specified actuator force of the actuator 22 the relative distance sensor does not sense any additional rotary motion, and at this location the absolute travel point WP is recognized, and the corresponding rotational angle value of the rotational angle sensor 32 is assigned to it in the control device. The physical position of the absolute travel point WP is prescribed by the stop 31, so that starting from the latter, the determination of the number of counted rotational angle increments in combination with the pitch m yields the absolute travel distance. In the interest of completeness, let it be noted that in the event of a movement in the direction of switching over the freewheeling mechanism 10, the brake 14 remains disengaged or is opened still further, depending on the design of the actuating mechanism 23.

Figure 4:
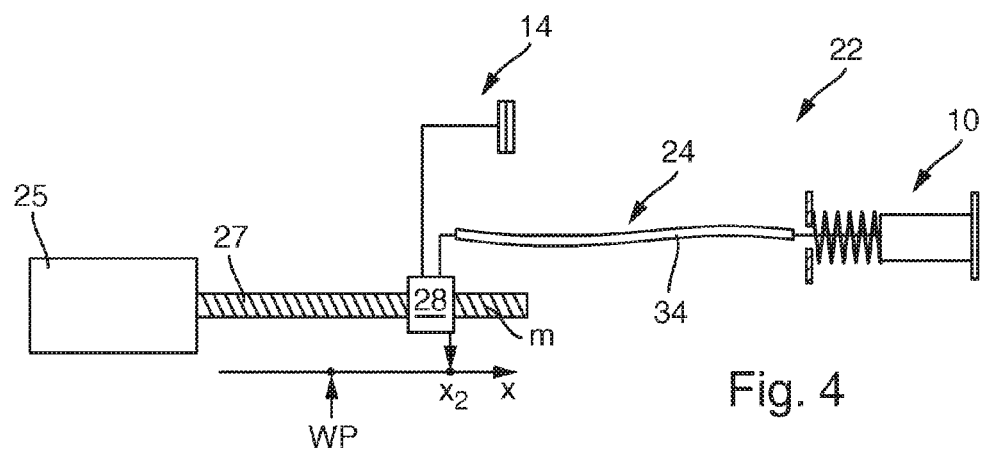
FIG. 4 illustrates the actuator of FIGS. 2 and 3 with the brake engaged.

FIG. 4 shows the actuator 22 with the brake 14 engaged, in that the spindle nut 28 is moved away from the absolute travel point WP along the segment $x_2$ of the travel distance x by opposite rotation of the spindle 27 by the electric motor 25. In this case, the freewheeling mechanism 10 remains in its preferred switched state. Depending on the design of the actuating mechanism 24, the control cable 34 in this case is additionally slackened, or its further actuation is interrupted, for example, by a stop.

Reference Variables 1 drivetrain
2 internal combustion engine
3 belt drive
4 friction clutch
5 gear unit
6 driving wheel
7 belt starter-generator
8 crankshaft
9 rotor
10 free wheeling mechanism
11a switched state
11b switched state
12 planetary gear set
13 ring gear
14 brake
15 sun gear
16 planet gear
17 web
18 ancillary unit
19 air conditioner compressor
20 pulley damper
21 engine housing
22 actuator
23 actuating mechanism
24 actuating mechanism
25 electric motor
26 rotor
27 spindle
28 spindle nut
29 free wheeling cage
30 spring device
31 stop
32 rotational angle sensor
33 relative distance sensor
34 cable control
35 stop
m pitch
N zero position
x travel distance
$x_1$ segment
$x_2$ segment
WP absolute travel point

What is claimed is:

1. A method for controlling a switchable planetary gear set (12) in a belt drive (3) of an internal combustion engine (2) in a motor vehicle, having a sun gear (15) which is fixedly connected to a belt pulley, a ring gear (13) which can be connected fixedly with respect to a housing by means of a brake (14) which is activated by an electrically operated actuator (22) which is effective along a travel distance (x) which is monitored by a relative distance sensor (33), and a web (17) which is connected to a crankshaft (8) of the internal combustion engine (2) and rotatably accommodates planetary gears (16), wherein situated between the sun gear (15) and the web (17) is a freewheeling mechanism (10) which can be switched and rolled over in both directions and is switched by the same actuator (22) along the travel distance (x), the method comprising:
    ascertaining the travel distance (x) of the actuator (22) by means of travel distance signals of the relative distance sensor (33);
    referencing the relative distance sensor (33) to an absolute value by means of at least one reference pass of the actuator (22);
    analyzing an electrical behavior of the actuator (22) at at least one specified travel point (WP) of the travel distance (x); and,
    establishing the at least one specified travel point (WP) as an absolute value depending on the electrical behavior of the actuator (22).

2. The method recited in claim 1 further comprising actuating the brake (14) along a first segment ($x_2$) and actuating the freewheeling mechanism (10) along a second segment ($x_1$).

3. The method recited in claim 2 further comprising situating the at least one travel point (WP) along the second segment ($x_1$) to actuate the freewheeling mechanism (10).

4. The method recited in claim 1 further comprising ascertaining the at least one travel point (WP) by a stop (31).

5. The method recited in claim 4 further comprising:
    reliably placing the freewheeling mechanism (10) in an actively actuated switching position (11a); and,
    situating the stop (31).

6. The method recited in claim 1 wherein the electrical behavior is a change of current, voltage or power while the travel distance signal of the relative distance sensor (33) remains unchanged.

7. The method recited in claim 1 further comprising ascertaining the relative travel distance from rotational angle increments of a rotational angle sensor (32) of an electric motor (25) which drives a spindle (27), in combination with a pitch (m) of the spindle (27).

8. The method recited in claim 1 further comprising carrying out the routine for referencing at least prior to a start of the internal combustion engine (2).

9. The method recited in claim 8 wherein the routine occurs depending on detection of the presence of a driver in the motor vehicle.

10. The belt drive (3) on the internal combustion engine (2) of a motor vehicle for carrying out the method as recited in claim 1, said belt drive having a plurality of units, which enter into operative connection with a belt, including a belt starter-generator (7), the switchable planetary gear set (12) having the sun gear (15) which is fixedly connected to the belt pulley, the ring gear (13) which can be connected fixedly with respect to the housing by means of the brake (14) which is activated by the electrically operated actuator (22) which is effective along the travel distance (x) which is monitored by the relative distance sensor (33), as well as the web (17) which is connected to the crankshaft (8) of the internal combustion engine (2) and rotatably accommodates planetary gears (16), wherein situated between the sun gear (15) and the web (17) is the freewheeling mechanism (10) which can be switched and rolled over in both directions and is switched by the same actuator (22) along the travel distance (x).

11. A belt drive for an internal combustion engine of a motor vehicle, comprising:
 a belt starter-generator including a rotor;
 a brake;
 an electrically operated actuator;
 a sensor arranged to monitor a travel distance;
 a switchable planetary gear set including:
  a sun gear fixedly connected to the rotor;
  a ring gear which can be fixedly connected with respect to a housing by the brake;
  a plurality of planetary gears; and,
  a web arranged for connection to a crankshaft of the internal combustion engine and rotatably accommodating the plurality of planetary gears;
 a freewheeling mechanism:
  situated between the sun gear and the web; and,
  switchable between first and second states by the actuator, wherein:
 in a first state, the freewheeling mechanism enables torque flow from the crankshaft to the rotor and blocks torque flow from the rotor to the crankshaft; and,
 in a second state, the freewheeling mechanism blocks torque flow from the crankshaft to the rotor and enables torque flow from the rotor to the crankshaft.

12. A belt drive for an internal combustion engine of a motor vehicle, comprising:
 a belt starter-generator including a rotor;
 a brake;
 a freewheeling mechanism having first and second states;
 an actuator including:
  a threaded spindle having a neutral position;
  a spindle nut:
   engaged with the threaded spindle and displaceable along the threaded spindle; and,
   connected to the brake and the freewheeling mechanism;
  an electric motor arranged to rotate the threaded spindle to displace the spindle nut in first and second opposite directions along the threaded spindle; and,
 a planetary gear set including:
  a sun gear fixedly connected to the rotor;
  a ring gear which can be fixedly connected to a housing by the brake;
  a plurality of planetary gears; and,
  a web arranged for connection to a crankshaft of the internal combustion engine and rotatably accommodating the plurality of planetary gears, wherein:
 the freewheeling mechanism is situated between the sun gear and the web;
 the electric motor is arranged to displace the spindle nut, in the first direction, from the neutral position to switch the freewheeling mechanism between the first and second states and open the brake;
 the electric motor is arranged to displace the spindle nut, in the second direction, from the neutral position to close the brake;
 in the first state, the freewheeling mechanism enables torque flow from the crankshaft to the rotor and blocks torque flow from the rotor to the crankshaft; and,
 in a second state, the freewheeling mechanism blocks torque flow from the crankshaft to the rotor and enables torque flow from the rotor to the crankshaft.

* * * * *